United States Patent
Bhunia et al.

(10) Patent No.: US 11,756,244 B1
(45) Date of Patent: Sep. 12, 2023

(54) SYSTEM AND METHOD FOR HANDWRITING GENERATION

(71) Applicant: Mohamed bin Zayed University of Artificial Intelligence, Abu Dhabi (AE)

(72) Inventors: Ankan Kumar Bhunia, Abu Dhabi (AE); Salman Khan, Abu Dhabi (AE); Hisham Cholakkal, Abu Dhabi (AE); Rao Muhammad Anwer, Abu Dhabi (AE); Fahad Khan, Abu Dhabi (AE)

(73) Assignee: Mohamed bin Zayed University of Artificial Intelligence, Abu Dhabi (AE)

( * ) Notice: Subject to any disclaimer, the term of this patent is extended or adjusted under 35 U.S.C. 154(b) by 0 days.

(21) Appl. No.: 17/868,140

(22) Filed: Jul. 19, 2022

Related U.S. Application Data

(60) Provisional application No. 63/324,847, filed on Mar. 29, 2022.

(51) Int. Cl.
| | | |
|---|---|---|
| G06F 3/048 | (2013.01) | |
| G06T 11/20 | (2006.01) | |
| G06F 3/04886 | (2022.01) | |
| G06V 30/22 | (2022.01) | |

(52) U.S. Cl.
CPC ........ *G06T 11/203* (2013.01); *G06F 3/04886* (2013.01); *G06V 30/22* (2022.01)

(58) Field of Classification Search
None
See application file for complete search history.

(56) References Cited

U.S. PATENT DOCUMENTS

| | | | |
|---|---|---|---|
| 2015/0220803 A1* | 8/2015 | Chan | G06V 30/40 382/312 |
| 2019/0026019 A1* | 1/2019 | Guiavarc'H et al. | G06F 3/0487 |
| 2021/0166013 A1* | 6/2021 | Tensmeyer | G06N 3/045 |
| 2022/0058842 A1 | 2/2022 | Kotani et al. | |

FOREIGN PATENT DOCUMENTS

| | | |
|---|---|---|
| CN | 110765966 A | 2/2020 |
| CN | 113822847 A | 12/2021 |
| WO | 2021/237517 A1 | 12/2021 |

OTHER PUBLICATIONS

Vaswani, et al. ; Tensor2Tensor for Neural Machine Tranlsation ; Mar. 16, 2018 ; 9 Pages.

* cited by examiner

*Primary Examiner* — William C Trapanese
(74) *Attorney, Agent, or Firm* — Oblon, McClelland, Maier & Neustadt, L.L.P.

(57) ABSTRACT

A system and computer readable storage medium for automated handwriting generation, including a text input device for inputting a text query having at least one textual word string, an image input device for inputting a handwriting sample with characters in a writing style of a user, and a computer implemented deep learning transformer model including an encoder network and a decoder network in which each are a hybrid of convolution and multi-head self-attention networks. The encoder produces a sequence of style feature embeddings from the input handwriting sample. The decoder takes the sequence of style feature embeddings in order to convert the at least one textual word string into a generated handwritten image having substantially same writing style as the handwriting sample. An output device to output the generated handwriting image.

20 Claims, 10 Drawing Sheets

HWT

*Most of us write by hand without giving it much thought but the way we write can also reveal a lot about our personalities*

FIG. 1C

GANwriting

*Most of us write by hand without giving it much thought but the way we write can also reveal a lot about our persona*

FIG. 1D

Davis et al.

*Most of us write by hand without giving it much thought, but the way we write can also reveal a lot about our personalities*

SYSTEM AND METHOD FOR HANDWRITING GENERATION

CROSS-REFERENCE TO RELATED APPLICATIONS

This application claims the benefit of priority to provisional application No. 63/324,847 filed Mar. 29, 2022, the entire contents of which are incorporated herein by reference.

STATEMENT REGARDING PRIOR DISCLOSURE BY THE INVENTORS

Aspects of this technology are described in an article Bhunia, Ankan Kumar, et al. "Handwriting transformers." *Proceedings of the IEEE/CVF International Conference on Computer Vision.* 2021 and is herein incorporated by reference in its entirety. This conference was held 10-17 Oct. 2021.

BACKGROUND OF THE INVENTION

Field of the Invention

The invention pertains to the field of automated handwriting generation, systems for implementing automated handwriting generation and in particular a handwriting transformer that explicitly encodes style-content entanglement at the character-level.

Description of the Related Art

Automatic handwritten text generation can be beneficial for people having disabilities or injuries that prevent them from writing, for translating a note or a memo from one language to another by adapting an author's writing style, or for gathering additional data for use in training deep learning-based handwritten text recognition models. For example, a person may have had suffered a hand injury making it difficult to write or may have developed a muscle disorder that prevents the individual from writing in their original writing style. There may be cases where a person wishes to write a note in a foreign language in a manner that appears that the foreign language writing is authentic and in their own writing style. In addition there is a need for handwriting generation in order to increase the number of training examples for training machine learning models.

A challenge that makes handwriting generation difficult is realistic handwritten text generation of unconstrained text sequences with arbitrary length and diverse calligraphic attributes representing writing styles of a writer.

Generative Adversarial Networks (GANs) are one approach that have been investigated for offline handwritten text image generation. See Ian J Goodfellow, Jean Pouget-Abadie, Mehdi Mirza, Bing Xu, David Warde-Farley, Sherjil Ozair, Aaron Courville, and Yoshua Bengio. Generative adversarial networks. *arXiv preprint arXiv:* 1406.2661, 2014; Bo Chang, Qiong Zhang, Shenyi Pan, and Lili Meng. Generating handwritten chinese characters using cyclegan. In *WACV*, pages 199-207. IEEE, 2018; Eloi Alonso, Bastien Moysset, and Ronaldo Messina. Adversarial generation of handwritten text images conditioned on sequences. In *ICDAR*, pages 481-486. IEEE, 2019; Lei Kang, Pau Riba, Yaxing Wang, Marçal Rusiñol, Alicia Fornés, and Mauricio Villegas. Ganwriting: Content-conditioned generation of styled handwritten word images. In *ECCV*, pages 273-289. Springer, 2020; Sharon Fogel, Hadar Averbuch-Elor, Sarel Cohen, Shai Mazor, and Roee Litman. Scrabblegan: semi-supervised varying length handwritten text generation. In *CVPR*, pages 4324-4333, 2020; and Brian Davis, Chris Tensmeyer, Brian Price, Curtis Wigington, Bryan Morse, and Rajiv Jain. Text and style conditioned gain for generation of offline handwriting lines. *BMVC,* 2020, each incorporated herein by reference in their entirety. These methods strive to directly synthesize text images by using offline handwriting images during training, thereby extracting useful features, such as writing appearance (e.g., ink width, writing slant) and line thickness changes. A generative architecture that is conditioned on input content strings, thereby not restricted to a particular pre-defined vocabulary has been proposed. However, this approach involves training on isolated fixed-sized word images and struggles to produce high quality arbitrarily long text. In addition, this approach suffers from style collapse, where the style becomes arbitrary as the length of text increases beyond a certain range. A ScrabbleGAN approach has been proposed whereby generated image width is made proportional to the input text length. ScrabbleGAN is shown to achieve impressive results with respect to the content. However, these approaches do not adapt to a specific author's writing style.

Recently, GAN-based approaches have been introduced for the problem of styled handwritten text image generation. See Davis et al. and Kang et al. These methods take into account both content and style, when generating offline handwritten text images. An approach based on StyleGAN and learn generated handwriting image width based on style and input text has been proposed. See Tero Karras, Samuli Laine, and Timo Aila. A style-based generator architecture for generative adversarial networks. In *CVPR*, pages 4401-4410, 2019, incorporated herein by reference in its entirety. The GANwriting framework conditions handwritten text generation process to both textual content and style features in a few-shot setup.

There are two key issues that impede the quality of styled handwritten text image generation in the existing GAN-based methods. First, both style and content are loosely connected as their representative features are processed separately and later concatenated. While such a scheme enables entanglement between style and content at the word/line-level, it does not explicitly enforce style-content entanglement at the character-level. Second, although these approaches capture global writing style (e.g., ink width, slant), they do not explicitly encode local style patterns (e.g., character style, ligatures). As a result of these issues, these example approaches struggle to accurately imitate local calligraphic style patterns from reference style examples.

Techniques for handwriting generation may involve inputting examples of writing style of a particular user and the query text that will be output as the generated handwriting. FIG. 1A is an example writing style of a person, while FIG. 1B is an example of query text. FIG. 1C illustrates an output from a handwriting transformer (HWT) of the present disclosure. FIG. 1D illustrates an output using the GANwriting technique. FIG. 1E illustrates a conventional output. Thus, FIGS. 1C, 1D, 1E illustrate a comparison of HWT with GANwriting and other techniques in imitating the desired unseen writing style of FIG. 1A for a given query text of FIG. 1B. While some methods capture global writing styles (e.g., slant), they struggle to imitate local style patterns (e.g., character style, ligatures). HWT of FIG. 1C imitates both global and local styles, leading to a more realistic styled handwritten text image generation. For instance, style of 'n' appearing in FIG. 1A is mimicked by HWT, for a different word including same character 'n'. Similarly, a group of characters in 'thought' and 'personalities' are styled in a way that matches with words ('throughout' and 'qualities') sharing some common characters in FIG. 1A. It can be seen that HWT preserves cursive patterns and connectivity of all characters in word 'also'.

Recent deep learning-based handwritten text generation approaches can be roughly divided into stroke-based online and image-based offline methods. Online handwritten text generation methods typically require temporal data acquired from stroke-by-stroke recording of real handwritten examples (vector form) using a digital stylus pen. See Alex Graves, Generating sequences with recurrent neural networks. *arXiv preprint arXiv:* 1308.0850, 2013; and Emre Aksan, Fabrizio Pece, and Otmar Hilliges. Deepwriting: Making digital ink editable via deep generative modeling. In *CHI*, pages 1-14, 2018, each incorporated herein by reference in their entirety. On the other hand, recent generative offline handwritten text generation methods aim to directly generate text by performing training on offline handwriting images.

An approach based on Recurrent Neural Network (RNN) with Long-Term Memory (LSTM) cells may permit prediction of future stroke points from previous pen positions and an input text. A method based on conditional Variational RNN (VRNN) splits an input o separate latent variables to represent content and style. However, this approach tends to average out particular styles across writers, thereby reducing details. See Atsunobu Kotani, Stefanie Tellex, and James Tompkin. Generating handwriting via decoupled style descriptors. In *ECCV*, pages 764-780. Springer, 2020, incorporated herein by reference in its entirety. The VRNN module may be substituted by Stochastic Temporal CNNs which may provide more consistent generation of handwriting. See Emre Aksan and Otmar Hilliges. Stcn: Stochastic temporal convolutional networks. *arXiv preprint arXiv:* 1902.06568, 2019, incorporated herein by reference in its entirety. An online handwriting stroke representation approach to represent latent style information by encoding writer-, character- and writer-character-specific style changes within an RNN model may also be possible.

Other than sequential methods, offline handwritten text image generation using GANs may be feasible. An approach to generate new text in a distinct style inferred from source images has been proposed. See Tom S F Haines, Oisin Mac Aodha, and Gabriel J Brostow. My text in your handwriting. *TOG*, 35(3):1-18, 2016, incorporated herein by reference in its entirety. This model requires a certain degree of human intervention during character segmentation and is limited to generating characters that are in the source images. Cycle-GAN can be used to synthesize images of isolated handwritten characters of Chinese language. See Jun-Yan Zhu, Taesung Park, Phillip Isola, and Alexei A Efros. Unpaired image-to-image translation using cycle-consistent adversarial networks. In *ICCV*, pages 2223-2232, 2017, incorporated herein by reference in its entirety. Handwritten text generation may also be conditioned by character sequences. However, this approach suffers from style collapse hindering the diversity of synthesized images. ScrabbleGAN operates by synthesizing handwritten word using a fully convolutional architecture. Here, the characters generated have similar receptive field width. See Fogel et al. A conversion model hat approximates online handwriting from offline samples followed by using style transfer technique to the online data has been used. See Martin Mayr, Martin Stumpf, Anguelos Nikolaou, Mathias Seuret, Andreas Maier, and Vincent Christlein. Spatio-temporal handwriting imitation. *arXiv preprint arXiv:* 2003.10593, 2020, incorporated herein by reference in its entirety. This approach relies on conversion model's performance.

Few recent GAN-based works investigate the problem of offline styled handwritten text image generation. Handwritten text generation can also be conditioned on both text and style, capturing global handwriting style variations. GAN-writing, that conditions text generation on extracting style features in a few-shot setup and textual content of a pre-defined fixed length.

An object is handwriting generation that explicitly encodes style-content entanglement at the character-level. A second object is modeling both the global as well as local style features for a given calligraphic style.

SUMMARY

An aspect is a system for automated handwriting generation, that can include a text input device for inputting a text query having at least one textual word string; an image input device for inputting a handwriting sample with characters in a writing style of a user; a computer implemented deep learning transformer model including an encoder network and a decoder network in which each are a hybrid of convolution and multi-head self-attention networks, wherein the encoder produces a sequence of style feature embeddings from the input handwriting sample, wherein the decoder takes the sequence of style feature embeddings in order to convert the at least one textual word string into a generated handwritten image having substantially same writing style as the handwriting sample; and an output device to output the generated handwriting image.

A further aspect is a system for automated handwriting generation, that can include a client device for inputting a text query having at least one textual word string and for inputting a handwriting sample with characters in a writing style of a user; a cloud service processing a deep learning transformer model including an encoder network and a decoder network in which each are a hybrid of convolution and multi-head self-attention networks, wherein the encoder produces a sequence of style feature embeddings from the input handwriting sample, wherein the decoder takes the sequence of style feature embeddings in order to convert the at least one textual word string into a generated handwritten image having substantially same writing style as the handwriting sample; and the client device receiving and displaying the generated handwriting image.

A further aspect is a non-transitive computer readable storage medium storing program code, which when executed by a computer, perform instructions according to a method including inputting a text query having at least one textual word string; inputting a handwriting sample with characters in a writing style of a user; producing, in an encoder network, a sequence of style feature embeddings from the input handwriting sample; receiving, by a decoder network, the sequence of style feature embeddings and converting the at least one textual word string into a generated handwritten image having substantially same writing style as the handwriting sample; and outputting the generated handwriting image.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1C illustrates handwriting generated using a handwriting transformer of the present disclosure; FIG. 1D illustrates handwriting generated using GANwriting technique; FIG. 1E illustrates handwriting generated using a technique described in Davis et al.;

FIG. 9 illustrates the qualitative comparison of the HWT (second column) with GANwriting (third column) and Davis et al. (fourth column).

DETAILED DESCRIPTION

Figure 1A:
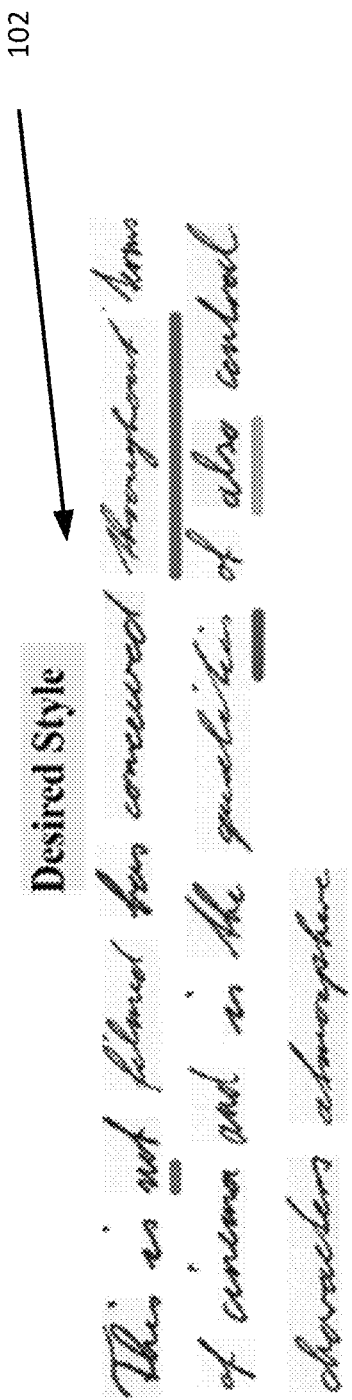
FIG. 1A is an example of desired handwriting style.
Figure 1B:
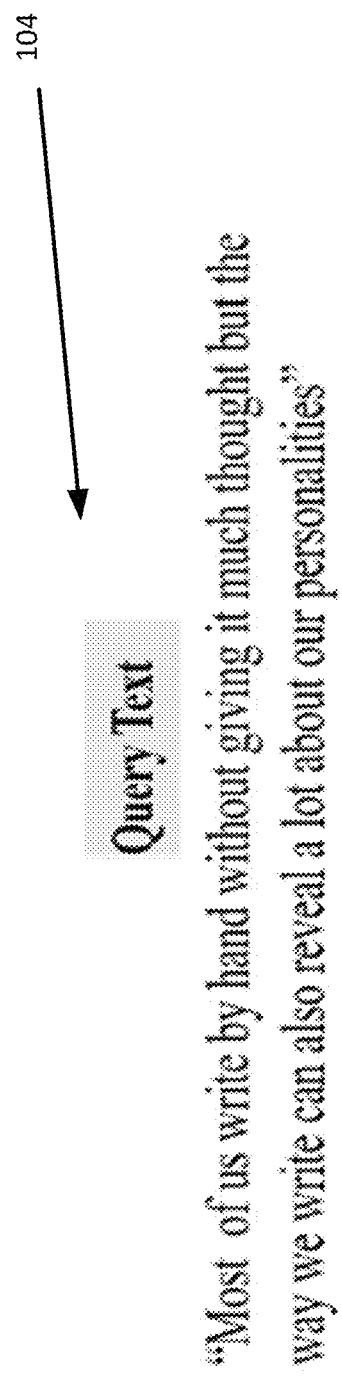
FIG. 1B is an example of a query text string.

Disclosed is a handwritten text generation approach that explicitly encodes style-content entanglement at the character-level. The handwritten text generation approach can model both the global as well as local style features for a given calligraphic style. The handwritten text generation approach is preferably built upon transformers and is referred to herein as a Handwriting Transformer (HWT). The HWT incorporates an encoder-decoder network. The encoder network utilizes a multi-headed self-attention mechanism to generate a self-attentive style feature sequence of a writer. This feature sequence is then input to the decoder network that includes a multi-headed self- and encoder-decoder attention to generate character-specific style attributes, given a set of query word strings. Subsequently, the resulting output is fed to a convolutional decoder to generate final styled handwritten text image(s). Moreover, the style consistency of the generated text is improved by constraining the decoder output through a loss term whose objective is to re-generate a style feature sequence of a writer at the encoder.

The HWT imitates the style of a writer for a given query content through self- and encoder-decoder attention that emphasizes relevant self-attentive style features with respect to each character in that query. This enables capture of style-content entanglement at the character-level. Furthermore, the self-attentive style feature sequence generated by the encoder captures both the global (e.g., ink width, slant) and local styles (e.g., character style, ligatures) of a writer within the feature sequence.

The disclosed HWT has been tested by conducting extensive qualitative, quantitative and human-based evaluations. In the human-based evaluation, the disclosed HWT was preferred 81% of the time over other styled handwritten text generation methods, achieving human plausibility in terms of the writing style mimicry. Following GANwriting, the HWT was evaluated on all the four settings on the IAM handwriting dataset. On the extreme setting of out-of-vocabulary and unseen styles (OOV-U), where both query words and writing styles are never seen during training, the disclosed HWT outperformed GANwriting with an absolute gain of 16.5 in terms of Frèchet Inception Distance (FID) thereby demonstrating superior generalization capabilities. Further, qualitative analysis suggests that the HWT performs favorably against existing works, generating realistic styled handwritten images (see FIGS. 1A, 1B, 1C, 1D, 1E).

In developing the HWT, first, two desirable characteristics to be considered were distinguished when designing an approach for styled handwritten text generation with varying length and any desired style in a few-shot setting, without using character-level annotation.

Style-Content Entanglement:

As discussed earlier, both style and content are loosely connected in known GAN-based works with separate processing of style and content features, which are later concatenated. Such a scheme does not explicitly encode style-content entanglement at the character-level. Moreover, there are separate components for style, content modeling followed by a generator for decoding stylized outputs. In addition to style-content entanglement at word/line level, an entanglement between style and content at the character-level is expected to aid in imitating the character-specific writing style along with generalizing to out-of-vocabulary content. Further, such a tight integration between style and content leads to a cohesive architecture design.

Global and Local Style Imitation:

While the previous requisite focuses on connecting style and content, the second desirable characteristic aims at modeling both the global as well as local style features for a given calligraphic style. Recent generative methods for styled handwritten text generation typically capture the writing style at the global level (e.g., ink width, slant). However, the local style patterns (e.g., character style, ligatures) are not explicitly taken into account while imitating the style of a given writer. Both global and local style patterns are desired to be imitated for accurate styled text image generation.

Figure 2:
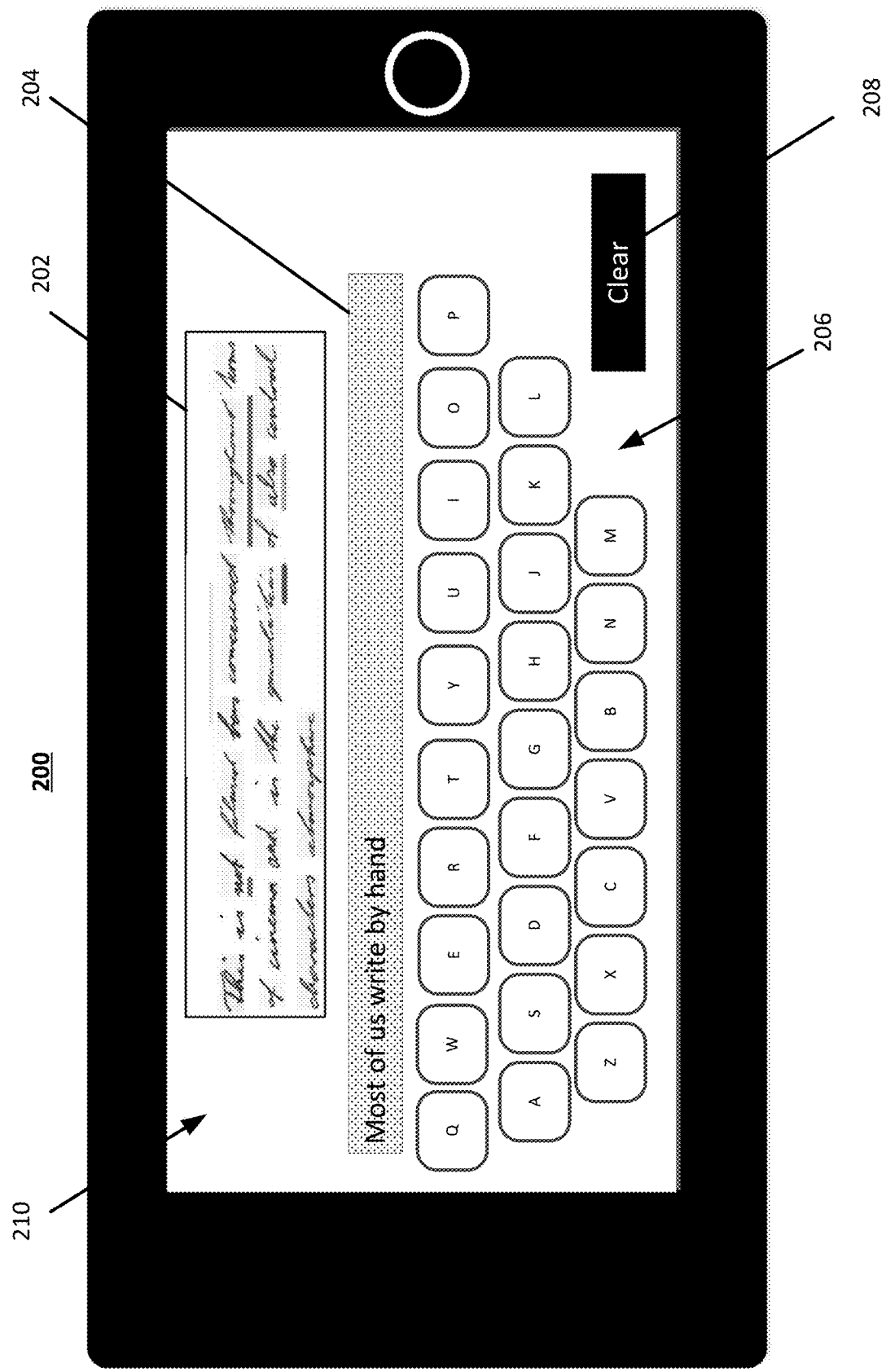
FIG. 2. illustrates a user interface screen for a smartphone or tablet for inputting a handwriting style example and a query text according to an exemplary aspect of the disclosure.

As mentioned above, automatic handwritten text generation can be beneficial for people having disabilities or injuries that prevent them from writing, for translating a note or a memo from one language to another by adapting an author's writing style, or for gathering additional data for training deep learning-based handwritten text recognition models. FIG. 2. illustrates a user interface screen for a smartphone, tablet, or other interactive display device for inputting a handwriting style example and a query text according to an exemplary aspect of the disclosure.

There may be cases where a person has lost the ability to write due to an injury or possibly a disease or other health-related problem, but had handwritten a message or document before the injury or other event that led to loss of ability to write. A previously scanned image of handwriting style of a disabled person may be imported for display 202 on a user interface screen 210 of a mobile device 200. In conjunction, a user may be presented with a physical or virtual keyboard 206, which may be used to enter a text as a query string entry 204. Function keys, such as a Clear Key 208 may be provided. The Clear key 208 may be used to clear the text from the query string entry 204, as necessary.

In some embodiments, the text entered into the query string entry 204 may be in a foreign language, such that handwriting generation will result in generation of handwriting according to the writing style 202 and is the foreign language of the query language string 204.

In some embodiments, a function key may be provided that enables translation of the text that is input to the query string entry 204 into another language.

Figure 3:
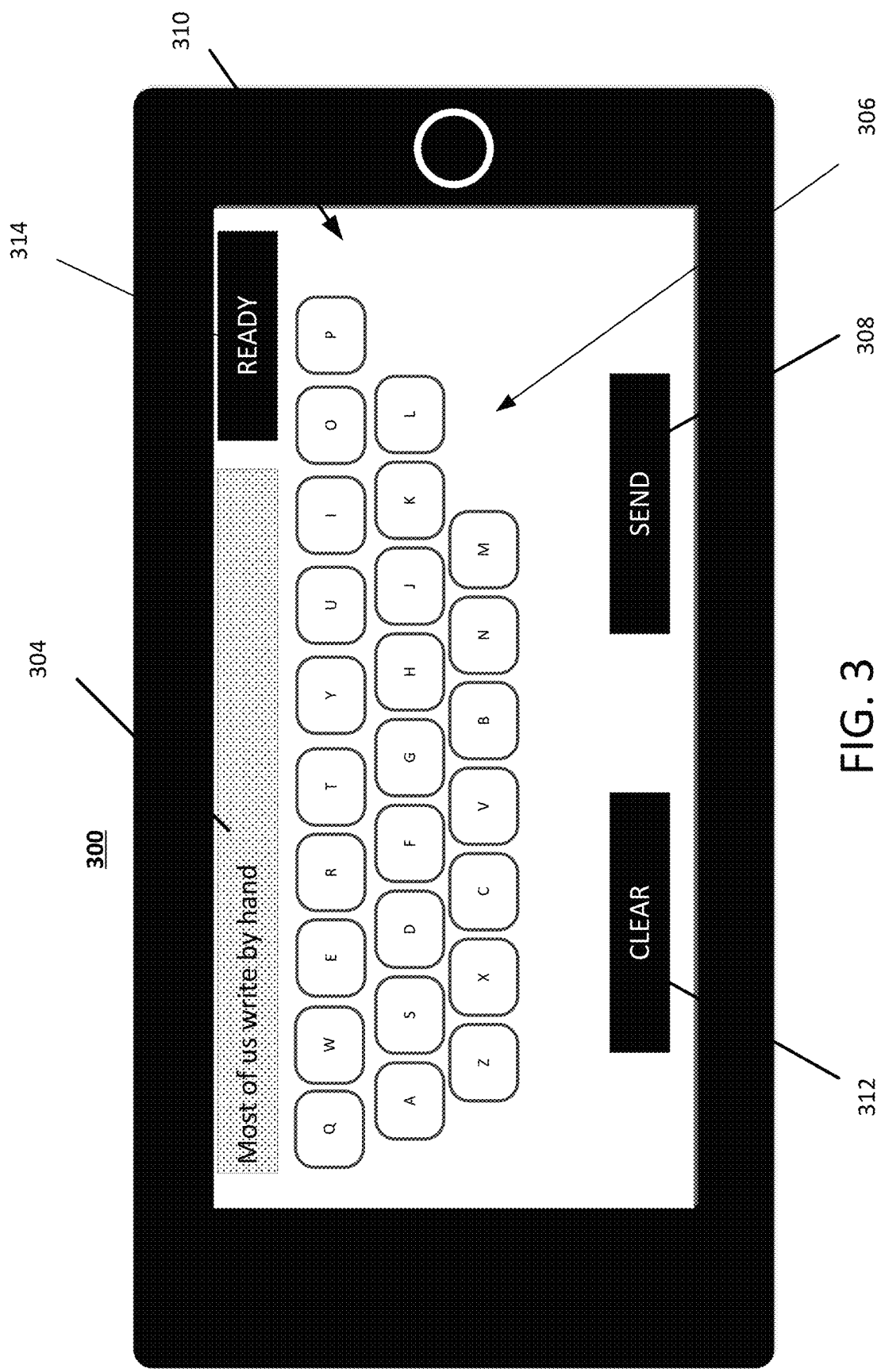
FIG. 3 illustrates a user interface screen for a smartphone or tablet for inputting a text string to be generated as handwriting.

FIG. 3 illustrates a user interface screen for a smartphone, tablet, or other interactive display device for inputting a text string to be generated as handwriting. The display device 300 may include a keypad interface 306 for inputting text as a query string entry 304, each within a user interface screen 310. User handwriting samples may have been previously stored for the user in a memory of the display device 300 or in an external device. The user interface screen 310 may include functions keys, such as, a Clear key 312 to clear the query string entry 304, and a Send key 308. The Send key 308 may enable the query string to be sent to a device that performs handwriting generation. In an embodiment, the display device 300 may include an indicator 314 that provides an indication that the generated handwriting is ready. For example, the generated handwriting may be automatically downloaded to the display device 300 and stored in an internal memory for future use.

In another example, the generated handwriting may be transmitted to a receiving device. The receiving device may be a device that is in communication with the display device 300, by way of near field communication or Bluetooth. One use may be that a user enters some text by way of the keypad 306, then places the display device 300 in communication with a nearby device as a receiving device. When the indicator 314 indicates that the generated handwriting is ready, the user may press the Send key 308 to have the generated handwriting transmitted to the nearby device in communication. The device in communication may display the generated handwriting.

Such a display device 300 having the user interface screen 310 may be used by a disabled person on a regular basis.

Figure 4:
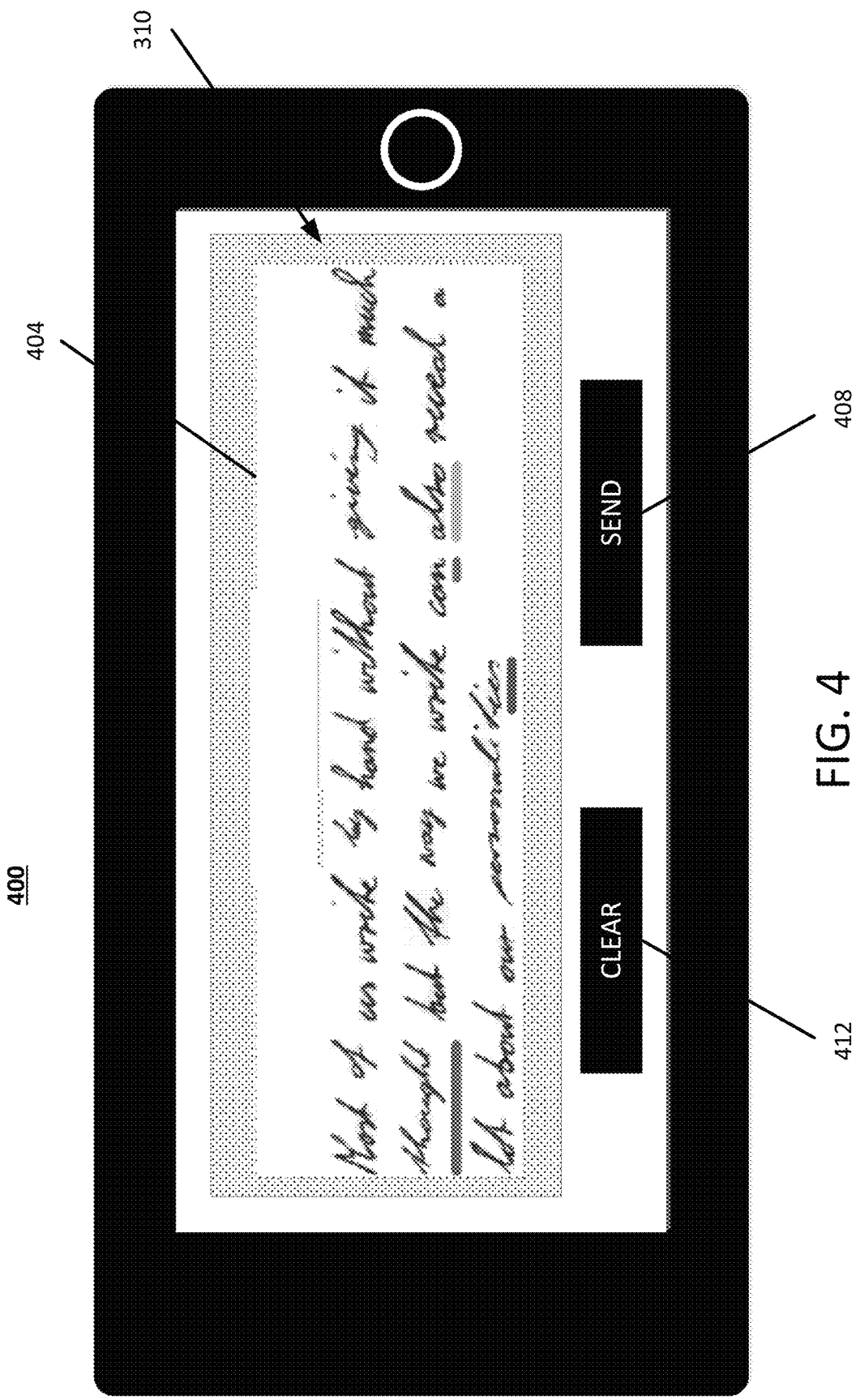
FIG. 4 illustrates a display screen for the smartphone or tablet for displaying as output generated handwriting.

FIG. 4 illustrates a display screen for the smartphone, tablet, or other interactive display device for displaying as output generated handwriting. The display device 400 includes a display screen 310, and a display area 404 within the display screen. A generating handwriting is displayed in the display area 404. The generated handwriting having been generated by a Handwriting Transformer (HWT). In an embodiment, the generated handwriting may be used for various purposes, including sharing with another device. A SEND button 408 may perform a function of sending the generated handwriting to another device. Other functions that may be performed include saving the generated handwriting in the display device local memory, saving the generated handwriting to a cloud storage service, or saving to a user specified storage device. When the generated handwriting is no longer needed for display, the display area 404 may be cleared using a CLEAR button 412.

Figure 5:
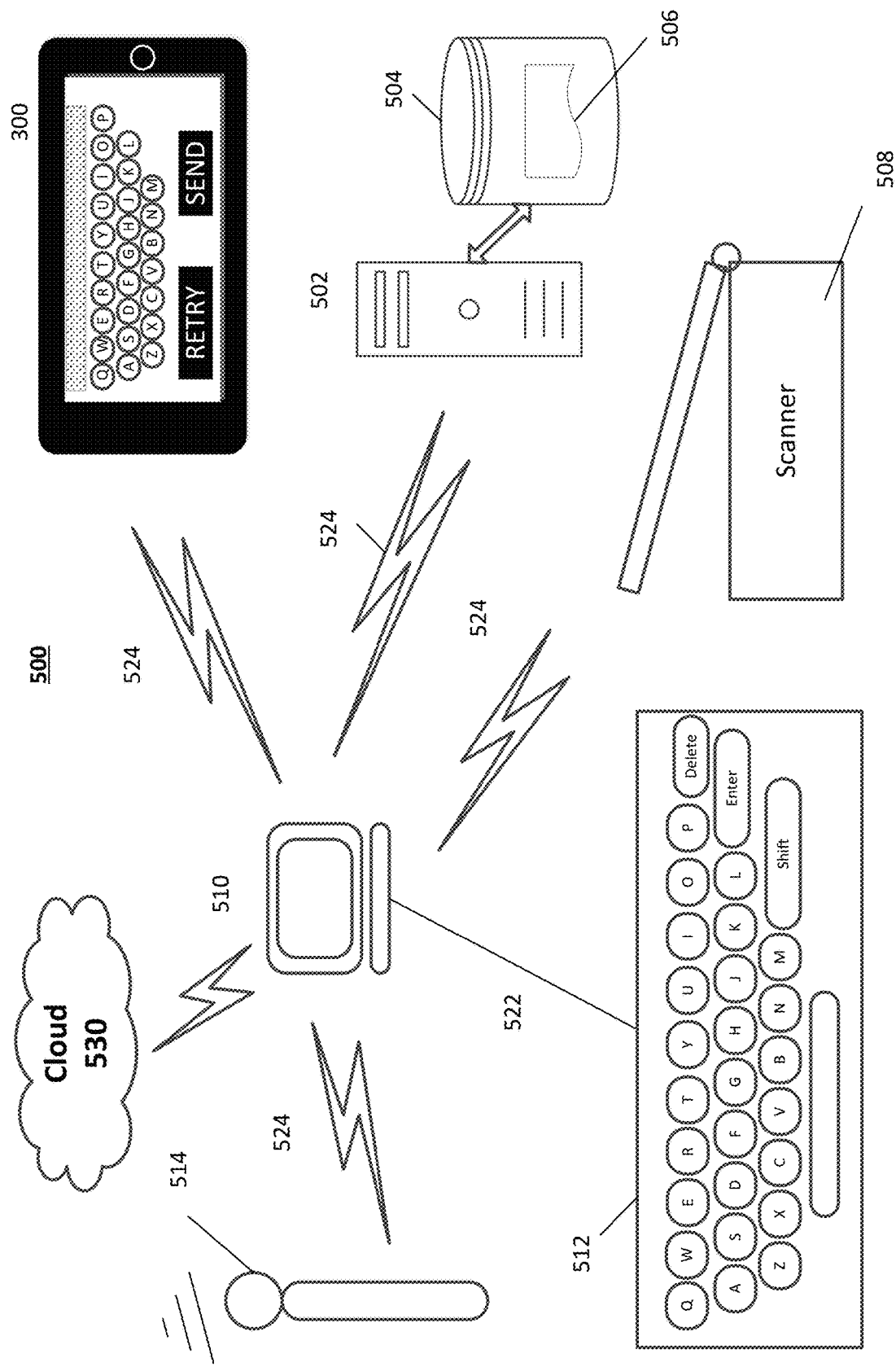
FIG. 5 is a system diagram for an exemplary handwriting generation system.

FIG. 5 is a system diagram for an exemplary handwriting generation system. The handwriting generation system 500 is shown with various example devices that may be used to accomplish handwriting generation for various purposes. The system 500 may include a server 502, optionally including and/or connected to a database system 504 for storing one or more documents 506. The system may include an optional scanner device 508 as well as a keyboard device 512 as possible input devices. The keyboard device 512 may be used to input text for the query string. The scanner device 508 may be used to input an image of a handwriting style.

In some embodiments, a microphone 514 may be used as an input for user speech as an alternative to a keyboard for text input for a query string. The devices, including the scanner device 508, keyboard device 512, and microphone 514 provide various ways to input a query string. In addition, interactive display device 300 may provide an additional input device for the query string. The various input devices may be wirelessly connected 524 to a client computer 510. In some cases, a device may have to be connected to the client computer 510. In addition, a client computer 510 may have a connection to a cloud service 530. A cloud service 530 or a server 502 may be used to implement training of the HWT. In cases where a client computer 510 is equipped for machine learning, the client computer 510 may be used to implement training of the HWT. Any of the server 502, client computer 510, cloud service 530 or interactive display device 300 may be used to perform inference for the HWT.

In an embodiment, a user may request that a file of text be generated as the users handwriting style. The file of text may be a document 506 stored in the database 504, or other file system. The HWT may generate handwritten text in the user's writing style using the file of text.

Figure 6:
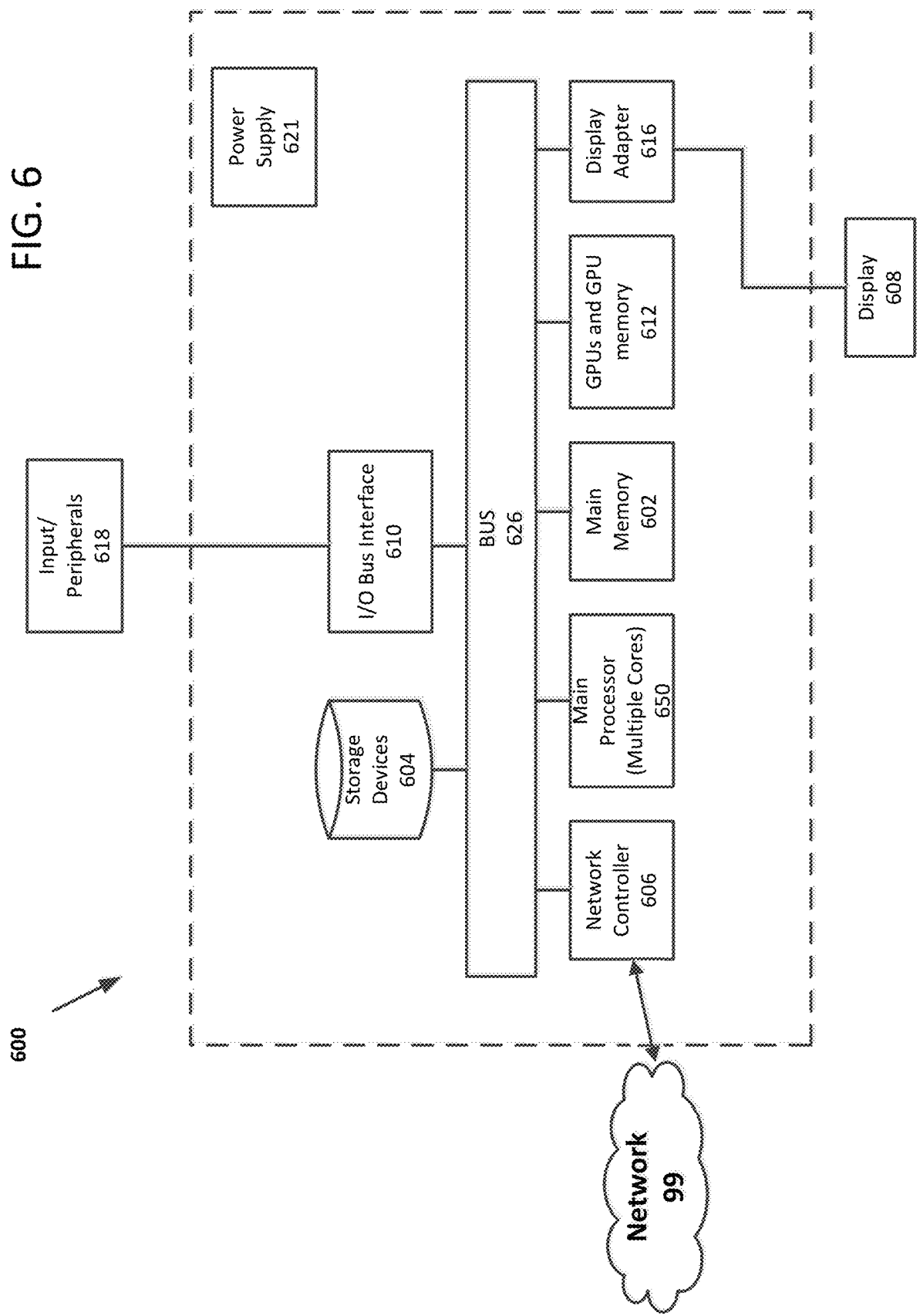
FIG. 6 is a block diagram for a computer workstation or server for performing a method of an exemplary embodiment.

FIG. 6 is a block diagram for a computer workstation or server for performing a method of an exemplary embodiment. The method may include training of the HWT as well as inference using a trained HWT. Although the block diagram shows typical components of a workstation, the computer workstation may be any computer device that is configured for deep learning and inference. As is known in the art, deep learning is a process that includes training of neural network models having several layers of artificial neuron nodes (hence are deep), at least some of which are hidden layers.

FIG. 6 is a block diagram illustrating an example computer system for implementing the machine learning training and inference methods according to an exemplary aspect of the disclosure. The computer system may be an AI workstation running a server operating system, for example Ubuntu Linux OS, Windows Server, a version of Unix OS, or Mac OS Server. The computer system 600 may include one or more central processing units (CPU) 650 having multiple cores. The computer system 600 may include a graphics board 612 having multiple GPUs, each GPU having GPU memory. The graphics board 612 may perform many of the mathematical operations of the disclosed machine learning methods. The computer system 600 includes main memory 602, typically random access memory RAM, which contains the software program being executed by the processing cores 650 and GPUs 612, as well as a non-volatile storage device 604 for storing data and the software program. Several interfaces for interacting with the computer system 600 may be provided, including an I/O Bus Interface 610, Input/Peripherals 618 such as a keyboard, touch pad, mouse, Display Adapter 616 and one or more Displays 608, and a Network Controller 606 to enable wired or wireless communication through a network 99. The interfaces, memory and processors may communicate over the system bus 626. The computer system 600 includes a power supply 621, which may be a redundant power supply.

In some embodiments, the computer system 600 may include a server-type CPU and a graphics card by NVIDIA, in which the GPUs have multiple CUDA cores.

Problem Formulation:

From an overall perspective, the HWT method aims to learn the complex handwriting style characteristics of a particular writer $i \in W$, where W includes a total of M writers. For training, the HWT is provided with a set of P handwritten word images, $X_i^s = \{x_{ij}\}_{j=1}^P$, as few-shot calligraphic style examples of each writer. The superscript 's' in $X_i^s$ denotes use of the set as a source of handwriting style which is transferred to the target images $\tilde{X}_i^t$ with new textual content but consistent style properties. The textual content is represented as a set of input query word strings $\mathcal{A} = \{a_u\}_{j=1}^Q$, where each word string $\alpha_j$ comprises an arbitrary number of characters from permitted characters set $\mathcal{C}$. The set $\mathcal{C}$ includes alphabets, numerical digits and punctuation marks etc. Given a query text string $\alpha_j \in \mathcal{A}$ from an unconstrained set of vocabulary and $X_i^s$, the disclosed model strives to generate new images $\hat{X}_i^s$ with the same text $a_j$ in the writing style of a desired writer i.

Figure 7:
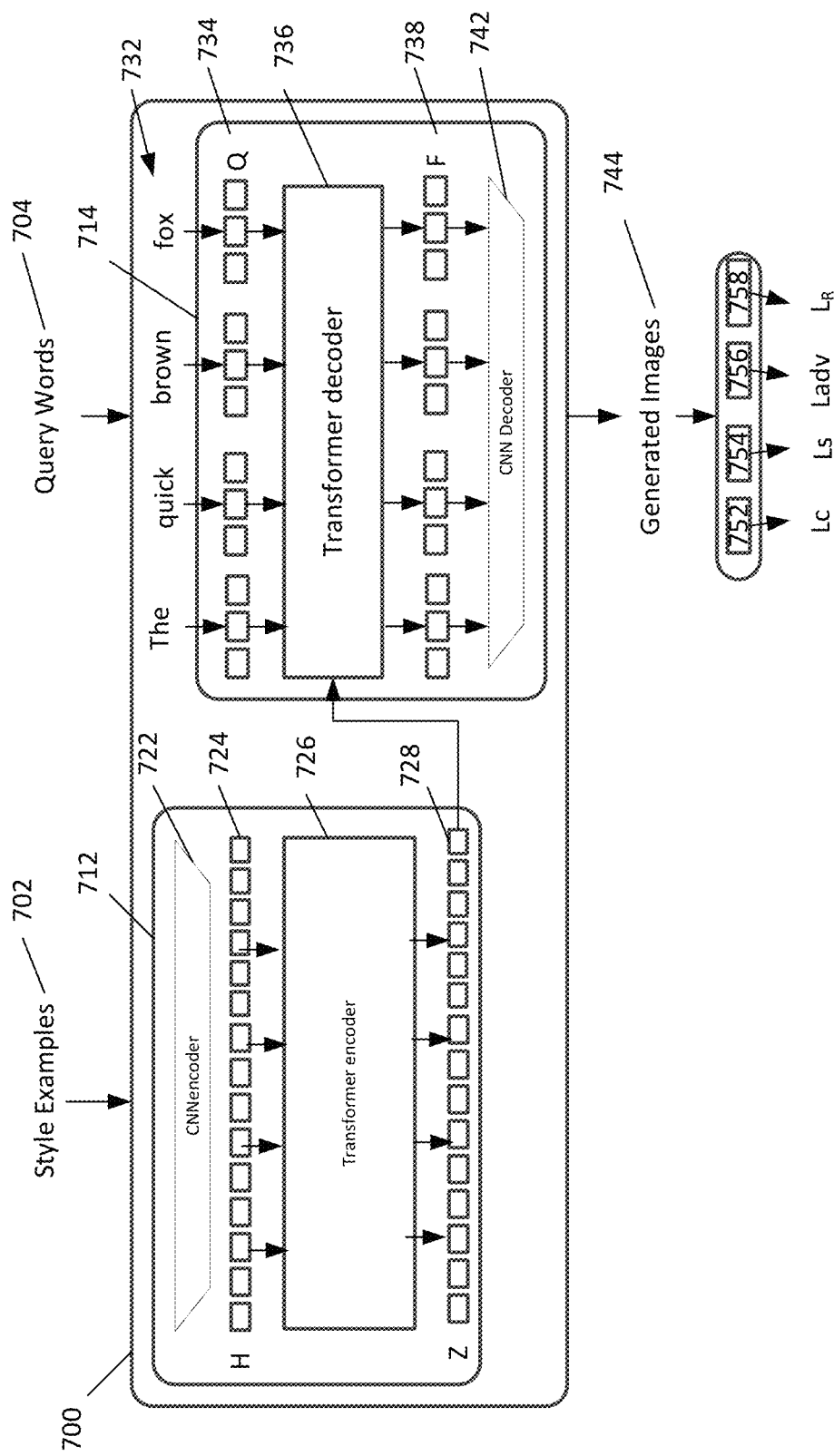
FIG. 7 is an architecture of a handwriting generation transformer in accordance with an exemplary aspect of the disclosure.

Overall Architecture:

FIG. 7 is a block diagram of an overall architecture of the HWT, where a conditional generator $G_\theta$ 700 synthesizes handwritten text images, a discriminator $D_\psi$ 756 ensures realistic generation of handwriting styles, a recognizer $R_\phi$ 758 aids in textual content preservation, and a style classifier $S_\eta$ 754 ensures satisfactory transfer of the calligraphic styles. The focus of the design is the introduction of a transformer-based generative network for styled handwritten text image generation of unconstrained length. The generator $G_\theta$ 700 is designed in consideration to the desirable characteristics listed earlier leveraging the learning capabilities of transformer models. To meticulously imitate a handwriting style, a model is desired to learn style-content entanglement as well as global and local style patterns.

To this end, the transformer-based handwriting generation model enables capturing of the long and short range contextual relationships within the style examples $X_i^s$. 702 by utilizing a self-attention mechanism. In this way, both the global and local style patterns are encoded. Additionally, the transformer-based model comprises an encoder-decoder attention that allows style-content entanglement by inferring the style representation for each query character. A direct applicability of transformer-based design is infeasible in a few-shot setting due to its large data requirements and quadratic complexity. To circumvent this issue, the architecture design utilizes the expressivity of a transformer within the CNN feature space.

The main idea of the HWT is effective. A transformer-based encoder $\mathcal{T}_\mathcal{E}$ 712 is first used to model self-attentive style context that is later used by a decoder $\mathcal{T}_\mathcal{D}$ 714 to generate query text in a specific writer's style. A learnable embedding vector is defined as $q_c \in \mathbb{R}^{512}$ for each character c of the permissible character set $\mathcal{C}$. For example, the query word 'deep' is represented as a sequence of its respective character embeddings $Q_{deep} = \{q_d \ldots q_p\}$. They are referred to as query embeddings. Such a character-wise representation of the query words and the transformer-based sequence processing helps the model to generate handwritten words of variable length, and also qualifies it to produce out-of-vocabulary words more efficiently. Moreover, it avoids averaging out individual character-specific styles in order to maintain the overall (global and local) writing style. The character-wise style interpolation and transfer is ensured by the self- and encoder-decoder attention in the transformer module that infers the style representation of each query character based on a set of handwritten samples provided as input. The generative architecture is described next and the loss objectives is described below.

Generative Network:

The generator $G_\theta$ 700 includes two main components: an encoder network $\mathcal{T}_\mathcal{E} : X_i^s \to \mathcal{Z}$ 712 and a decoder network $\mathcal{T}_\mathcal{D} : (\mathcal{Z}, \mathcal{A}) \to \hat{X}_i^t$ 714. The encoder 712 produces a sequence of feature embeddings $\mathcal{Z} \in \mathbb{R}^{N \times d}$ 728 (termed as style feature sequence) from a given set of style examples $X_i^s$ 702. The decoder 714 takes $\mathcal{Z}$ 728 as an input and converts the input word strings $a_j \in \mathcal{A}$ 704 to realistic handwritten images $\hat{X}_i^t$ 744 with same style as the given examples $X_i^s$ 702 of a writer i. Both the encoder 712 and decoder 714 networks constitute a hybrid design based on convolution and multi-head self-attention networks. This design combines the strengths of CNNs and transformer models i.e., highly expressive relationship modeling while working with limited handwriting images. It's worth mentioning that a CNN-only design would struggle to model long-term relations within sequences while an architecture based solely on transformer networks would demand large amount of data and longer training times. See Salman Khan, Muzammal Naseer, Munawar Hayat, Syed Waqas Zamir, Fahad Shahbaz Khan, and Mubarak Shah. Transformers in vision: A survey. *arXiv preprint arXiv:* 2101.01169, 2021, incorporated herein by reference in its entirety.

Encoder $\mathcal{T}_\mathcal{E}$ 712. The encoder 712 aims at modelling both global and local calligraphic style attributes (i.e., slant, skew, character shapes, ligatures, ink widths etc.) from the style examples $X_i^s$ 702. Before feeding style images to the highly expressive transformer architecture, the style examples are represented as a sequence. A straightforward way would be to flatten the image pixels into a 1D vector. See Alexey Dosovitskiy, Lucas Beyer, Alexander Kolesnikov, Dirk Weissenborn, Xiaohua Zhai, Thomas Unterthiner, Mostafa Dehghani, Matthias Minderer, Georg Heigold, Sylvain Gelly, et al. An image is worth 16×16 words: Transformers for image recognition at scale. *arXiv preprint arXiv:* 2010.11929, 2020, incorporated herein by reference in its entirety. However, given the quadratic complexity of transformer models and their large data requirements, this technique is infeasible. Instead, a CNN backbone network 722 is used to obtain sequences of convolutional features from the style images. First, a ResNet18 model is used to generate lower-resolution activation maps $h_{ij} \in \mathbb{R}^{h \times w \times d}$ for each style image $x_{ij}$. See Kaiming He, Xiangyu Zhang, Shaoqing Ren, and Jian Sun. Deep residual learning for image recognition. In *CVPR*, pages 770-778, 2016, incorporated herein by reference in its entirety. Then, the spatial dimension of $h_{ij}$ is flattened to obtain a sequence of feature maps of size n×d, where n=h×w. Each vector in the feature sequence represents a region in the original image and can be considered as the image descriptor for that particular region. After that, the feature sequence vectors extracted from all style images are concatenated together to obtain a single tensor $H_i \in \mathbb{R}^{N \times d}$ 724, where $N = n \times \mathcal{P}$.

The next step includes modeling the global and local compositions between all entities of the obtained feature sequence $\mathcal{Z}$ 728. A transformer-based encoder 726 is employed for that purpose. The transformer-based encoder 726 has L layers, where each layer has a standard architecture that consists of a multi-headed self-attention module and a Multi-layer Perceptron (MLP) block. At each layer l, the multi-headed self-attention maps the input sequence from the previous layer $H^{l-1}$ into a triplet (key K, query Q, value V) of intermediate representations given by $$Q = H^{l-1}W^Q, K = H^{l-1}W^K, V = H^{l-1}W^V,$$

where $W^Q \in \mathbb{R}^{N \times d_q}$, $W^K \in \mathbb{R}^{N \times d_k}$, and $W^V \in \mathbb{R}^{N \times d_v}$, are the learnable weight matrix for query, key and value respectively. For each head, the process is represented as, $$O^j = \text{softmax}\left(\frac{QK^T}{\sqrt{d_k}}\right) v \in \mathbb{R}^{N \times d_v}, j \in \{1, \ldots, J\}. \quad (1)$$

The concatenation of all $J$ head outputs $O=[O^1, \ldots, O^J]$ is then fed through an MLP layer to obtain the output feature sequence $H^l$ 724 for the layer l. This update procedure is repeated for a total of L layers, resulting in the final feature sequence $Z \in \mathbb{R}^{N \times d}$ 728. To retain information regarding the order of input sequences being supplied, fixed positional encodings are added to the input of each attention layer. See Ashish Vaswani, Noam Shazeer, Niki Parmar, Jakob Uszkoreit, Llion Jones, Aidan N. Gomez, undefinedukasz Kaiser, and Illia Polosukhin. Attention is all you need. In *NIPS*, page 6000-6010, Red Hook, NY, USA, 2017. Curran Associates Inc., incorporated herein by reference in its entirety.

Figure 8:
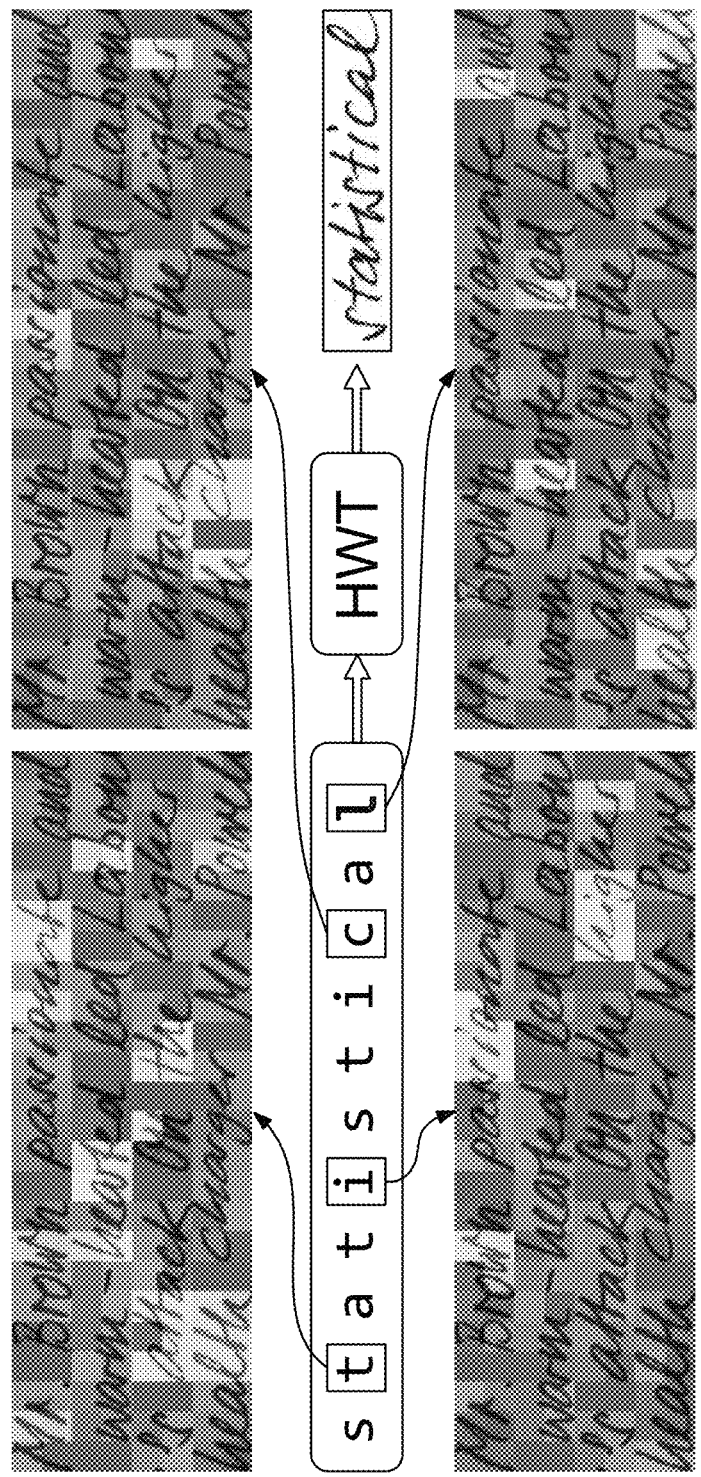
FIG. 8 illustrates encoder-decoder attention maps at the last layer of the transformer decoder in accordance with an exemplary aspect of the disclosure.

Decoder $\mathcal{T}_D$ 714. The initial stage in the decoder 714 uses the standard architecture of the transformer that consists of multi-headed self- and encoder-decoder attention mechanisms. Unlike the self-attention, the encoder-decoder attention derives the key and value vectors from the output 728 of the encoder, whereas the query vectors come from the decoder layer itself. For an $m_j$ character word $a_j \in \mathcal{A}$ (length $m_j$ being variable depending on the word), the query embedding $Q_{a_j} = \{q_{c_k}\}_{k=1}^{m_j}$ 734 is used as a learnt positional encoding to each attention layer of the decoder. Intuitively, each query embedding learns to look up regions of interest in the style images to infer the style attributes of all query characters (see FIG. 8). FIG. 8 illustrates the visualization of encoder-decoder attention maps at the last layer of the transformer decoder. The attention maps are computed for each character in the query word ('statistical') which are then mapped to spatial regions (heat maps) in the example style images. In FIG. 8, heat maps corresponding to the four different query characters 't', 'c' and 'l' are shown. For instance, the top-left attention map corresponding to the character 't', highlights multiple image regions containing the character 't'.

Over multiple consecutive decoding layers 736, the output embeddings accumulate style information, producing a final output $F_{a_j} = \{f_{c_k}\}_{k=1}^{m_j} \in \mathbb{R}^{m_j \times d}$ 738. The entire query embedding is processed in parallel at each decoder layer 736. A randomly sampled noise vector N(0, 1) is added to the output $F_{a_j}$ in order to model the natural variation of individual handwriting. For an m-character word, these $m_j$ embedding vectors are concatenated and passed through a linear layer, resulting in an $m_j \times 8192$ matrix. After reshaping the matrix to a dimension of $512 \times 4 \times 4m_j$, the matrix is passed through a CNN decoder 742 having four residual blocks followed by a tan h activation layer to obtain final output images 744 (styled hand written text images).

Training and Loss are described. The training algorithm follows the traditional GAN paradigm, where a discriminator network $D_\psi$ 756 is employed to tell apart the samples generated from generator $G_\theta$ 700 from the real ones. As the generated word images are of varying width, the discriminator $D_\psi$ 756 is also designed to be convolutional in nature. The hinge version of the adversarial loss defined as, $$L_{adv} = \mathbb{E}[\max(1-D_\psi(X_i^s,0))] + \mathbb{E}[\max(1+D_\psi(G_\theta(X_i^s, A)),0)]. \quad (2)$$

See Jae Hyun Lim and Jong Chul Ye. Geometric gan. *arXiv preprint arXiv:* 1705.02894, 2017, incorporated herein by reference in its entirety. While $D_\psi$ 756 promotes real-looking images, it does not preserve the content or the calligraphic styles. To preserve the textual content in the generated samples a handwritten recognizer network $R_\phi$ 758 is used that examines whether the generated samples are actually real text. The recognizer $R_\phi$ 758 is inspired by CRNN. See Baoguang Shi, Xiang Bai, and Cong Yao. An end-to-end trainable neural network for image-based sequence recognition and its application to scene text recognition. *PAMI*, 39(11):2298-2304, 2016, incorporated herein by reference in its entirety. The CTC loss is used to compare the recognizer output to the query words that were given as input to $G_\theta$ 700. See Alex Graves, Santiago Fernandez, Faustino Gomez, and Jürgen Schmidhuber. Connectionist temporal classification: labelling unsegmented sequence data with recurrent neural networks. In *ICML*, pages 369-376, 2006, incorporated herein by reference in its entirety. Recognizer $R_\phi$ 758 is only optimized with real, labelled, handwritten samples, but it is used to encourage $G_\theta$ 700 to produce readable text with accurate content. The loss is defined as, $$L_R = \mathbb{E}_{x \sim \{X_i^s, \tilde{X}_i^s\}}[-\Sigma \log(p(y_r|R^\phi(x)))]. \quad (3)$$

Here, $y_r$ is the transcription string of $x \sim \{X_i^s, \tilde{X}_i^t\}$.

A style classifier network $S_\eta$ 754 is employed to guide the network $G_\theta$ 700 in producing samples conditioned to a particular writing style. The network $S_\eta$ 754 attempts to predict the writer of a given handwritten image. The cross-entropy objective is applied as a loss function. $S_\eta$ 754 is trained only on the real samples using the loss given below, $$L_S = \mathbb{E}_{x \sim \{X_i^s, \tilde{X}_i^s\}}[-\Sigma y_r \log(S_\eta(x))]. \quad (4)$$

An important feature of the design is to utilize a cycle loss that ensures the encoded style features have cycle consistency. This cycle loss function enforces the decoder to preserve the style information in the decoding process, such that the original style feature sequence can be reconstructed from the generated image. Given the generated word images $\tilde{X}_i^t$ 744, the encoder $T_\varepsilon$ 752 is used to reconstruct the style feature sequence $\tilde{Z}$. The cycle loss $L_c$ minimizes the error between the style feature sequence Z 728 and its reconstruction $\tilde{Z}$ by means of a $L_1$ distance metric, $$L_c = \mathbb{E}[\|T_\varepsilon(X_i^s) - T_\varepsilon(\tilde{x}_i^t)\|_1]. \quad (5)$$

The cycle loss imposes a regularization to the decoder 714 for consistently imitating the writing style in the generated styled text images. Overall, HWT is trained in an end-to-end manner with the following loss objective, $$L_{total} = L_{adv} + L_S + L_R + L_c. \quad (6)$$

It is helpful to observe balancing of the gradients of the network $S_\eta$ 754 and $R_\phi$ 758 in the training with the loss formulation. Following Alonso et al., the $\nabla S_\eta$ and $\nabla R_\phi$ is normalized to have the same standard deviation ($\sigma$) as adversarial loss gradients, $$\nabla S_\eta \leftarrow \alpha\left(\frac{\sigma_D}{\sigma_S} \cdot \nabla S_\eta\right), \nabla R_\phi \leftarrow \alpha\left(\frac{\sigma_D}{\sigma_R} \cdot \nabla R_\phi\right). \quad (7)$$

Here, $\alpha$ is a hyper-parameter that is fixed to 1 during training of the disclosed model.

Extensive experiments were performed on IAM handwriting dataset. See U-V Marti and Horst Bunke. The iam-database: an English sentence database for offline handwriting recognition. *IJ-DAR*, 5(1):39-46, 2002, incorporated herein by reference in its entirety. It consists of 9862 text lines with around 62,857 English words, written by 500 different writers. For thorough evaluation, an exclusive subset of 160 writers were reserved for testing, while images from the remaining 340 writers are used for training the model. In all experiments, the images are resized to a fixed height of 64 pixels, while maintaining the aspect ratio of original image. For training, P=15 style example images, as in Kang et al. Both the transformer encoder 712 and transformer decoder 714 employ 3 attention layers (L=3) and each attention layer applies multi-headed attention having 8 attention heads (J=8). The embedding size d is set to 512. In all experiments, the model is trained for 4k epochs with a batch size of 8 on a single V100 GPU. Adam optimizer is employed during training with a learning rate of 0.0002.

Styled Handwritten Text Generation:

The disclosed approach (Tab. 1) is evaluated for styled handwritten text image generation, where both style and content are desired to be imitated in the generated text image. Frèchet Inception Distance (FID) is used as an evaluation metric for comparison. See Martin Heusel, Hubert Ramsauer, Thomas Unterthiner, Bernhard Nessler, and Sepp Hochreiter. Gans trained by a two time-scale update rule converge to a local nash equilibrium. *arXiv preprint arXiv:* 1706.08500, 2017, incorporated herein by reference in its entirety. The FID metric is measured by computing the distance between the Inception-v3 features extracted from generated and real samples for each writer and then averaging across all writers. The HWT is evaluated in comparison with GANwriting and Davis et al. in four different settings: In-Vocabulary words and seen styles (IV-S), In-Vocabulary words and unseen styles (IV-U), Out-of-Vocabulary words and seen styles (OOV-S), and Out-of-Vocabulary words and unseen styles (OOV-U). Among these settings, most challenging one is the OOV-U, where both words and writing styles are never seen during training. For OOV-S and OOV-U settings, a set of 400 words are used that are distinct from IAM dataset transcription, as in Kang et al. In all four settings, the transcriptions of real samples and generated samples are different. Tab. 1 shows that HWT performs favorably against both existing methods.

Table 1: Comparison of the HWT with GANwriting and Davis et al. in terms of FID scores computed between the generated text images and real text images of the IAM dataset. The disclosed HWT performs favorably against Kang et al. and Davis et al. in all four settings: In-Vocabulary words and seen style (IV-S), In-Vocabulary words and unseen style (IV-U), Out-of-vocabulary content and seen style (OOV-S) and Out-of-vocabulary content and unseen style (OOV-U). On the challenging setting of OOV-U, HWT achieves an absolute gain of 16.5 in FID score, compared to GANwriting. See Kang et al.

|  | IV-S | IV-U | OOV-S | OOV-U |
| --- | --- | --- | --- | --- |
| GANwriting | 120.07 | 124.30 | 125.87 | 130.68 |
| Davis et al. | 118.56 | 128.75 | 127.11 | 136.67 |
| HWT | 106.97 | 108.84 | 109.45 | 114.10 |

Figure 9:
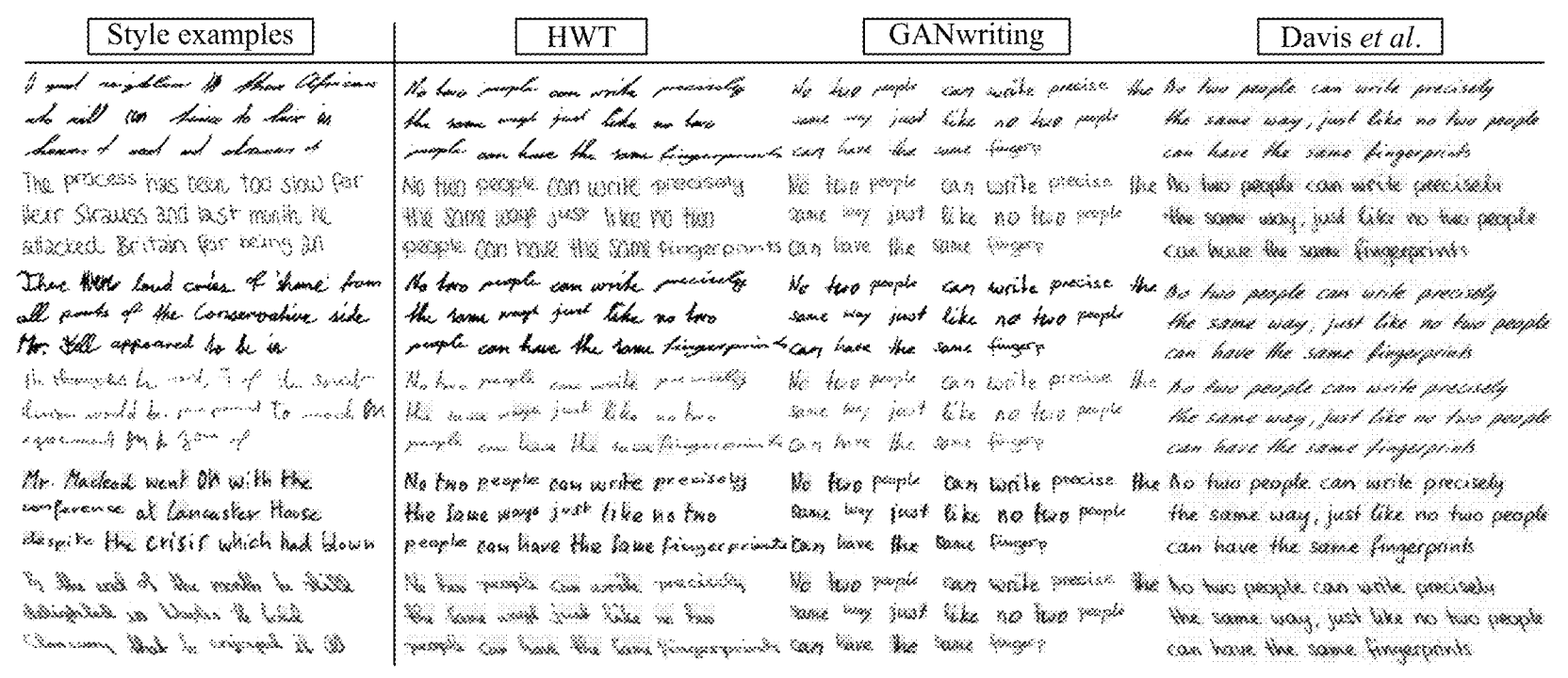

FIG. 9 presents the qualitative comparison of HWT with conventional methods for styled handwritten text generation. Results are provided for different writers, whose example style images are shown in the first column. For all the three methods, the same textual content are used. While Davis et al. follows the leftward slant of the last style example from the top, their approach struggles to capture character-level styles and cursive patterns (e.g. see the word 'the'). On the other hand, GANwriting struggles to follow leftward slant of the last style example from the top and character-level styles. The HWT better imitates both the global and local style patterns in these generated example text images.

Next, the quality of the handwritten text image generated is evaluated by the HWT. For a fair comparison with the recently introduced ScrabbleGAN and Davis et al., the results in the same evaluation settings are reported as used by Fogel et al. and Davis et al. Tab. 2 presents the comparison with Fogel et al. and Davis et al. in terms of FID and geometric-score (GS). The HWT achieves favorable performance, compared to both approaches in terms of both FID and GS scores. Different from Tab. 1, the results reported here in Tab. 2 indicates the quality of the generated images, compared with the real examples in the IAM dataset, while ignoring style imitation capabilities.

Table 2: Handwritten text image generation quality comparison of the HWT with ScrabbleGAN and Davis et al. on the IAM dataset. Results are reported in terms of FID and GS by following the same evaluation settings. The HWT performs favorably against these methods in terms of both FID and GS. Best results are in bold.

|  | FID | GS |
| --- | --- | --- |
| ScrabbleGAN | 20.72 | $2.56 \times 10^{-2}$ |
| Davis et al. | 20.65 | $4.88 \times 10^{-2}$ |
| HWT | 19.40 | $1.01 \times 10^{-2}$ |

Next, an Ablation study is described. Multiple ablation studies were performed on the IAM dataset to validate the impact of different components in the disclosed framework. Tab. 3 shows the impact of integrating transformer encoder (Enc), transformer decoder (Dec) and cycle loss (CL) to the baseline (Base). The baseline neither uses transformer modules nor utilizes cycle loss. It only employs a CNN encoder to obtain style features, whereas the content features are extracted from the one-hot representation of query words. Both content and style features are passed through a CNN decoder to generate styled handwritten text images. While the baseline is able to generate realistic text images, it has a limited ability to mimic the given writer's style leading to inferior FID score (row 1). The introduction of the transformer encoder into the baseline (row 2) leads to an absolute gain of 5.6 in terms of FID score, highlighting the importance of the transformer-based self-attentive feature sequence in the generator encoder. It can be seen that the generated sample still lacks details in terms of character-specific style patterns. When integrating the transformer decoder into the baseline (row 3), a significant gain of 9.6 was observed in terms of FID score. Notably, a significant improvement (17.9 in FID) was observed when integrating both transformer encoder and decoder to the baseline (row 4). This indicates the importance of self and encoder-decoder attention for achieving realistic styled handwritten text image generation. The performance is further improved by the introduction of cycle loss to the final HWT architecture (row 4).

Table 3: Impact of integrating transformer encoder (Enc), transformer decoder (Dec) and cycle loss (CL) to the baseline (Base) on the OOV-U settings of IAM dataset. Results are reported in terms of FID score. Best results are reported in bold. The right shows the effect of each component when generating two example words 'freedom' and 'precise' mimicking two given writing styles.

|  | FID ↓ | Style Example | |
|---|---|---|---|
| Base | 134.45 | | |
| Base + Enc | 128.80 | | |
| Base + Dec | 124.81 | | |
| Base + Enc + Dec | 116.50 | | |
| Base + Enc + Dec + CL | 114.10 | | |

As described earlier, HWT strives for style-content entanglement at character-level by feeding query character embeddings to the transformer decoder network. Here, the effect of character-level content encoding (conditioning) is evaluated by replacing it with word-level conditioning. The word-level embeddings are obtained by using an MLP that aims to obtain string representation of each query word. These embeddings are used as conditional input to the transformer decoder. Table 4 suggests that HWT benefits from character-level conditioning that ensures finer control of text style. The performance of word-level conditioning is limited to mimicking the global style, whereas the character-level approach ensures locally realistic as well as globally consistent style patterns.

Table 4: Comparison between word and character-level conditioning on IAM dataset. Results are reported in terms of FID score. The character-level conditioning performs favorably, compared to its word-level counterpart. Best results are reported in bold. On the right, it can be seen that the effect of word and character-level conditioning, when generating two example words 'symbols' and 'same' mimicking two given writing styles.

|  | FID ↓ | Style Example | |
|---|---|---|---|
| Word-level | 126.87 | | |
| Character-level | 114.10 | | |

Next a human evaluation is described. Here, results are presented for two user studies on 100 human participants to evaluate whether the HWT achieves human plausibility in terms of the style mimicry. First, a User preference study compares styled text images generated by the disclosed method with GANwriting and Davis et al. See Fogel et al. and Davis et al. Second, a User plausibility study that evaluates the proximity of the synthesized samples generated by the disclosed method to the real samples. In both studies, synthesized samples are generated using unseen writing styles of test set writers of IAM dataset, and for textual content sentences from Stanford Sentiment Treebank dataset are used. See Richard Socher, Alex Perelygin, Jean Wu, Jason Chuang, Christopher D Manning, Andrew Y Ng, and Christopher Potts. Recursive deep models for semantic compositionality over a sentiment treebank. In *EMNLP*, pages 1631-1642, 2013, incorporated herein by reference in its entirety.

For User preference study, each participant is shown the real handwritten paragraph of a person and synthesized handwriting samples of that person using HWT, Davis et al. and GANwriting, randomly organized. See Fogel et al. and Davis et al. The participants were asked to mark the best method for mimicking the real handwriting style. In total, 1000 responses were collected. The results of this study shows that the disclosed HWT was preferred 81% of the time over the other two methods.

For User plausibility study, each participant is shown a person's actual handwriting, followed by six samples, where each of these samples is either genuine or synthesized handwriting of the same person. Participants are asked to identify whether a given handwritten sample is genuine or not (forged/synthesized) by looking at the examples of the person's real handwriting. Thus, each participant provides 60 responses, thereby collection is made of 6000 responses for 100 participants. For this study, only 48.1% of the images have been correctly classified, thereby showing a comparable performance to a random choice in a two-class problem.

A transformer-based styled handwritten text image generation approach is disclosed, referred to as HWT, that comprises a conditional generator having an encoder-decoder network. The HWT captures the long and short range contextual relationships within the writing style example through a self-attention mechanism, thereby encoding both global and local writing style patterns. In addition, HWT utilizes an encoder-decoder attention that enables style-content entanglement at the character-level by inferring the style representation for each query character. Qualitative, quantitative and human-based evaluations show that the HWT produces realistic styled handwritten text images with varying length and any desired writing style.

Numerous modifications and variations of the present invention are possible in light of the above teachings. It is therefore to be understood that within the scope of the appended claims, the invention may be practiced otherwise than as specifically described herein.

The invention claimed is:

1. A system for automated handwriting generation, comprising:
    a text input device for inputting a text query having at least one textual word string;
    an image input device for inputting a handwriting sample with characters in a writing style of a user;
    a computer implemented deep learning transformer model including an encoder network and a decoder network in which each are a hybrid of a convolution network and a multi-head self-attention network having a plurality of attention heads,
    wherein the encoder produces a sequence of style feature embeddings from the input handwriting sample,
    wherein the decoder takes the sequence of style feature embeddings to convert the at least one textual word string into a generated handwritten image having substantially same writing style as the handwriting sample; and
    an output device to output a generated handwriting image.

2. The system of claim 1, wherein the text input device receives the textual word string as a sequence of individual characters.

3. The system of claim 1, wherein a self-attention network of the decoder network derives a key-value vector from the output of the encoder network, and
    the text query is obtained from the decoder.

4. The system of claim 1, wherein the encoder network is trained with handwriting style images and includes a backbone convolutional neural network to obtain sequences of convolutional features, and the transformer encoder has multiple layers, each layer including a multi-headed self-attention module and a multi-layer perceptron block; and
    wherein the decoder network includes an initial stage that has a multi-headed self-attention mechanism and follows with multiple decoding layers to produce query vectors, the output of the decoder network is processed in a convolution neural network decoder and an activation layer to output styled hand written text images.

5. The system of claim 1, wherein during training, a cycle loss function enforces the decoder to preserve style information in the decoder.

6. The system of claim 5, wherein the cycle loss function minimizes an error between a style feature sequence of the encoder and its reconstruction by means of a distance metric.

7. The system of claim 1, further comprising:
an interactive display device having a virtual keyboard as the text input device and a first display region for displaying the text query; and
a second display region displaying the handwriting sample that is in the writing style of the user.

8. The system of claim 7, wherein the interactive display device further includes a display as the output device for the generated handwriting image.

9. The system of claim 1, further comprising:
an interactive display device having a virtual keyboard as the text input device and a first display region for displaying the text query; and
a send button having a function for sending the text query to an external computer device, the external computer device including the deep learning transformer model.

10. The system of claim 9, wherein the interactive display device further includes an indicator, wherein the indicator provides an indication that the generated handwriting has been completed by the external computer device.

11. A system for automated handwriting generation, comprising:
a client device for inputting a text query having at least one textual word string and for inputting a handwriting sample with characters in a writing style of a user;
a cloud service processing a deep learning transformer model including an encoder network and a decoder network in which each are a hybrid of a convolution network and a multi-head self-attention network having a plurality of attention heads,
wherein the encoder produces a sequence of style feature embeddings from the input handwriting sample,
wherein the decoder takes the sequence of style feature embeddings o convert the at least one textual word string into a generated handwritten image having substantially same writing style as the handwriting sample; and
the client device receiving and displaying the generated handwriting image.

12. The system of claim 11, wherein the client device receives the textual word string as a sequence of individual characters.

13. The system of claim 11, wherein a self-attention network of the decoder derives a key-value vector from the output of the encoder network, and the text query is obtained from the decoder.

14. The system of claim 11, wherein the encoder network is trained with handwriting style images and includes a backbone convolutional neural network to obtain sequences of convolutional features, and the transformer encoder has multiple layers, each layer including a multi-headed self-attention module and a multi-layer perceptron block; and
wherein the decoder network includes an initial stage that has a multi-headed self-attention mechanism and follows with multiple decoding layers to produce query vectors, the output of the decoder network is processed in a convolution neural network decoder and an activation layer to output styled hand written text images.

15. The system of claim 11, wherein during training, a cycle loss function enforces the decoder to preserve style information in the decoder.

16. The system of claim 15, wherein the cycle loss function minimizes an error between a style feature sequence of the encoder and its reconstruction by means of a distance metric.

17. The system of claim 11, further comprising:
an interactive display device having a virtual keyboard for inputting the text query for the client device; and
the interactive display device having a second display region displaying the handwriting sample that is in the writing style of the user.

18. The system of claim 17, wherein the interactive display device further includes a display device for the generated handwriting image.

19. The system of claim 18, wherein the interactive display device further includes an indicator, wherein the indicator provides an indication that the generated handwriting has been completed by the cloud service.

20. A non-transitive computer readable storage medium storing program code, which when executed by a computer, perform instructions according to a method comprising:
inputting a text query having at least one textual word string;
inputting a handwriting sample with characters in a writing style of a user;
encoding, in an encoder network configured as a hybrid of a convolution network and a multi-head self-attention network having a plurality of attention heads, a sequence of style feature embeddings from the input handwriting sample;
receiving, by a decoder network configured as a hybrid of convolution network and multi-head self-attention network having a plurality of attention heads, the sequence of style feature embeddings and the at least one textual word string and converting the at least one textual word string into a generated handwritten image having substantially same writing style as the handwriting sample; and
outputting the generated handwriting image.

* * * * *